(12) United States Patent
Luan

(10) Patent No.: US 7,507,287 B1
(45) Date of Patent: Mar. 24, 2009

(54) ACTIVATED CARBON AS MERCURY RELEASE CONTROL AGENT IN GYPSUM CALCINATION

(75) Inventor: Wenqi Luan, Hawthorn Woods, IL (US)

(73) Assignee: United States Gypsum Company, Chicago, IL (US)

( * ) Notice: Subject to any disclaimer, the term of this patent is extended or adjusted under 35 U.S.C. 154(b) by 7 days.

(21) Appl. No.: 11/937,844

(22) Filed: Nov. 9, 2007

(51) Int. Cl.
*C04B 11/00* (2006.01)
(52) U.S. Cl. .................... 106/772; 423/210; 423/239.1; 502/416; 502/417
(58) Field of Classification Search ................ 106/772; 423/210, 239.1; 502/416, 417
See application file for complete search history.

(56) References Cited

U.S. PATENT DOCUMENTS

| | | | |
|---|---|---|---|
| 4,533,528 A | 8/1985 | Zaskalicky | |
| 5,558,710 A | 9/1996 | Baig | |
| 5,811,066 A * | 9/1998 | Winkler et al. | ............... 423/210 |
| 5,827,352 A | 10/1998 | Altman et al. | |
| 6,719,828 B1 | 4/2004 | Lovell et al. | |
| 6,855,859 B2 | 2/2005 | Nolan et al. | |
| 6,981,456 B2 | 1/2006 | Lissianski et al. | |
| 7,048,781 B1 | 5/2006 | Lovell | |
| 7,407,602 B2 | 8/2008 | Hurley | |
| 2004/0033184 A1 | 2/2004 | Greer | |
| 2004/0180788 A1 | 9/2004 | Khalili et al. | |
| 2005/0274307 A1 | 12/2005 | Lissianski et al. | |
| 2006/0034743 A1 | 2/2006 | Radway et al. | |
| 2006/0204418 A1 | 9/2006 | Chao et al. | |
| 2006/0205592 A1 | 9/2006 | Chao et al. | |
| 2006/0210463 A1 * | 9/2006 | Comrie | ..................... 423/215.5 |
| 2007/0051239 A1 | 3/2007 | Holmes et al. | |

FOREIGN PATENT DOCUMENTS

| | | |
|---|---|---|
| EP | 0 864 536 B1 | 5/2003 |
| WO | WO 2004/080574 A1 | 9/2004 |
| WO | WO 2006/096376 A2 | 9/2006 |
| WO | WO 2006/099611 A1 | 9/2006 |

* cited by examiner

*Primary Examiner*—Paul Marcantoni
(74) *Attorney, Agent, or Firm*—Pradip K. Sahu; David F. Janci; Philip T. Petti

(57) ABSTRACT

A method for providing effective mercury release control during gypsum calcination is disclosed. The method comprises providing a reactor and gypsum containing mercury; providing a mercury sorbent, such as activated carbon and/or derivatives thereof in the reactor; and calcining the gypsum in the reactor to form stucco. The mercury contaminant present in the gypsum is sorbed by the mercury sorbent during the calcination process. The mercury content of the stucco is substantially similar in amount to the mercury content of the uncalcined gypsum.

20 Claims, 7 Drawing Sheets

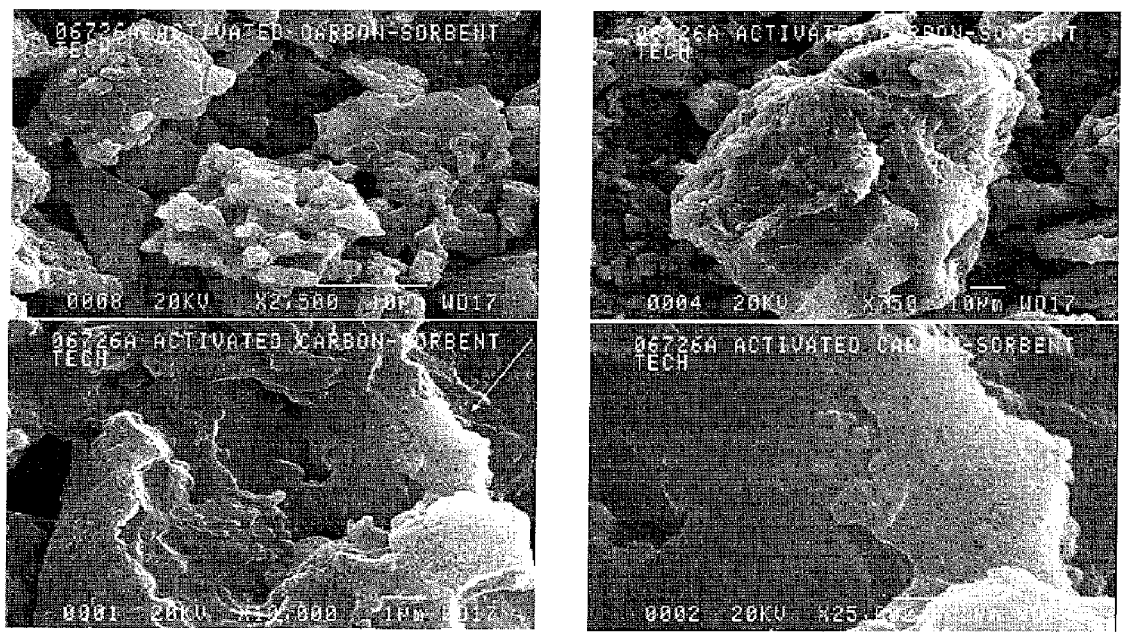
Figure 2. SEM Images of Activated Carbon

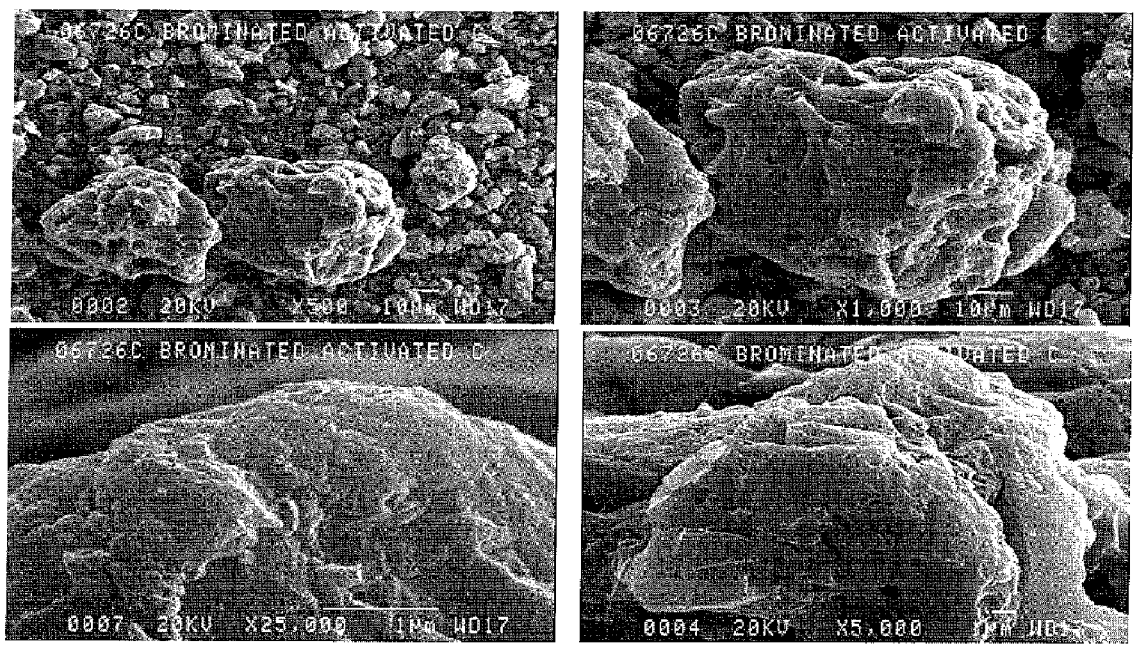
Figure 3. SEM Images of Brominated Activated Carbon

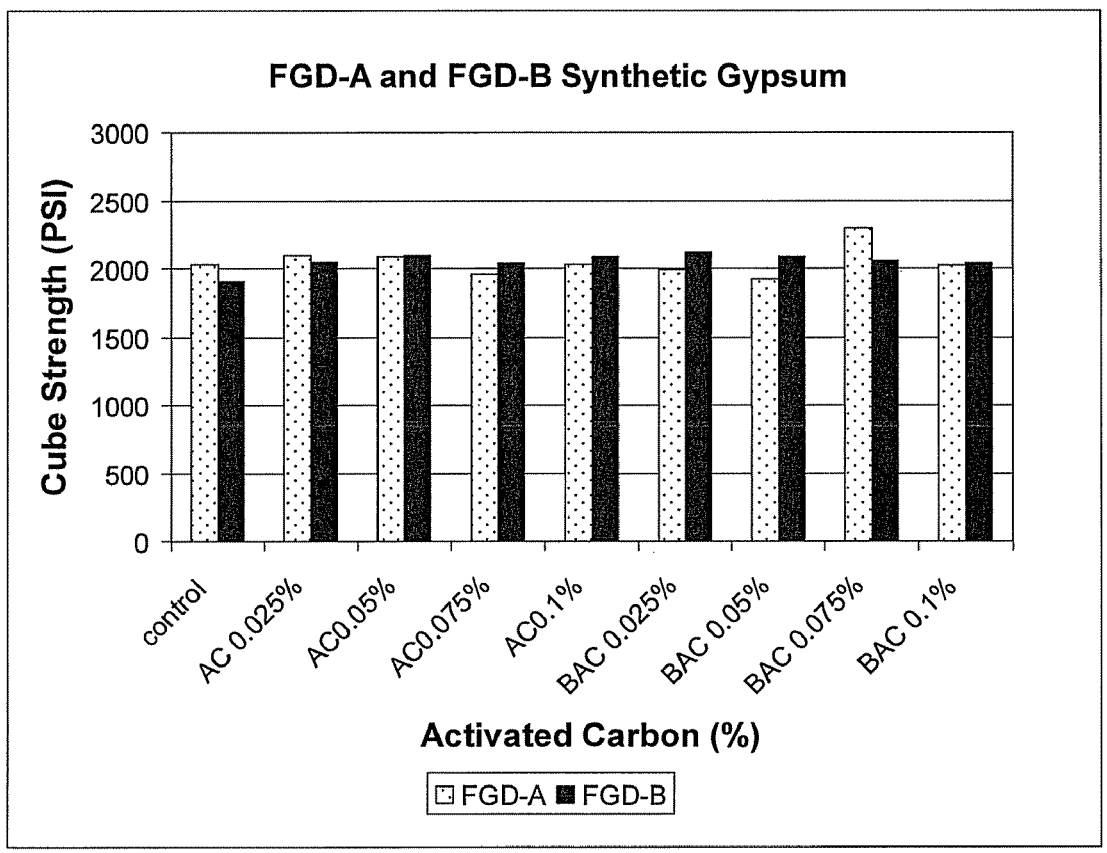
Figure 4. Cube strength of stucco containing mercury sorbent.

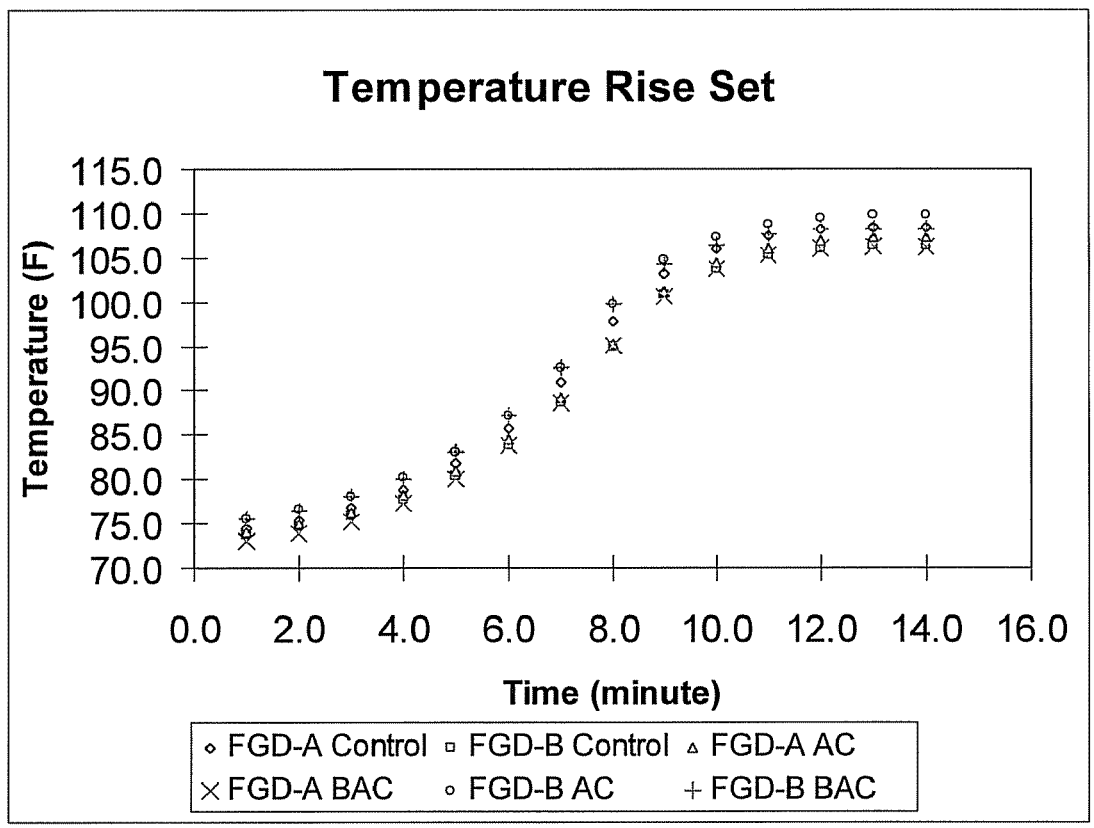
Figure 5. Effect of mercury on stucco rehydration temperature rise set.

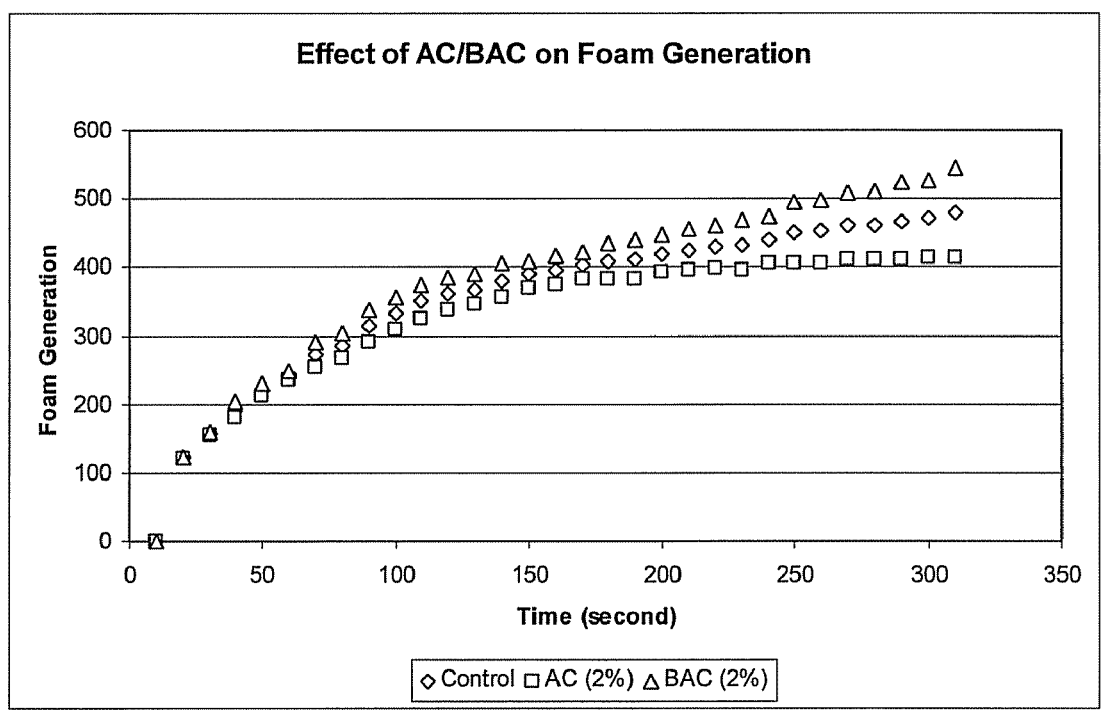
Figure 6. Effect of mercury sorbent on foam generation.

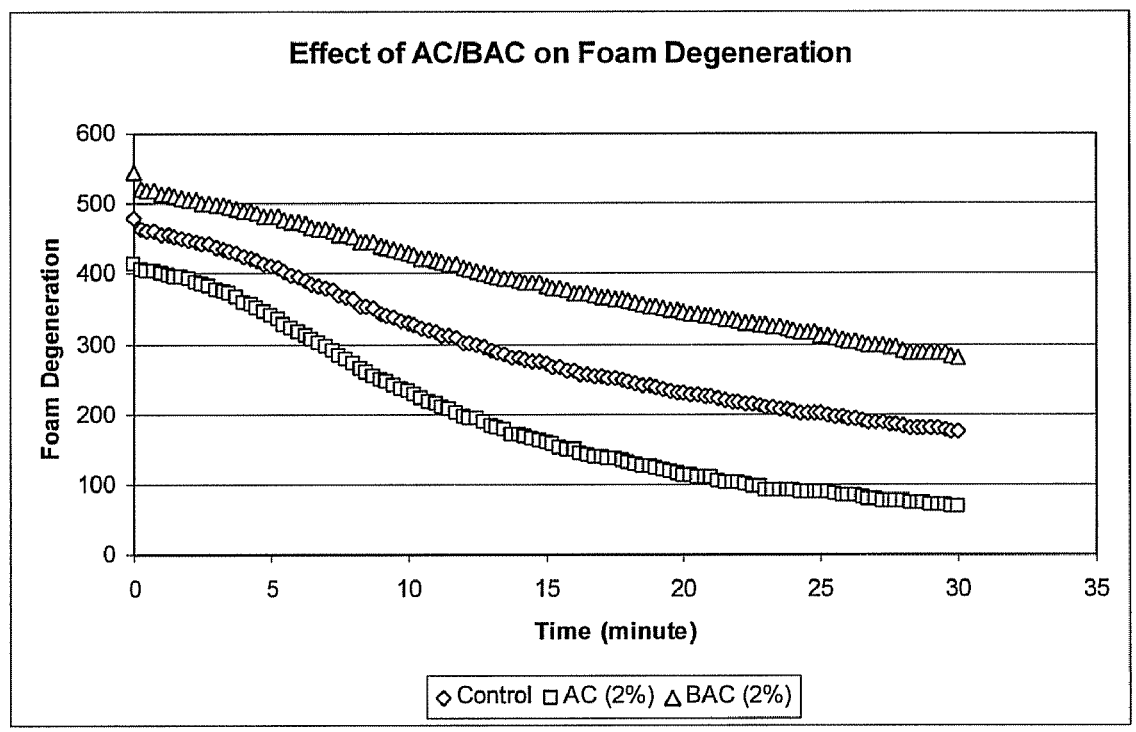
Figure 7. Effect of mercury sorbent on foam degeneration.

ACTIVATED CARBON AS MERCURY RELEASE CONTROL AGENT IN GYPSUM CALCINATION

BACKGROUND

1. Technical Field

This disclosure is directed toward a method for providing mercury sorption during gypsum calcination, wherein the method utilizes a mercury sorbent such as activated carbon and/or derivatives thereof to capture mercury released from the gypsum during calcination.

2. Description of the Related Art

Emissions from electricity-generating facilities such as sulfur dioxide ($SO_2$), nitrogen oxide ($NO_x$), and mercury (Hg) are known to cause detrimental impacts to human health and the environment. Coal-burning power plants currently account for the majority of $SO_2$ emissions in the United States. To reduce $SO_2$ emissions, Congress passed the Clean Air Act Amendment of 1990 (the "Act") to regulate $SO_2$ emissions generated by power plants.

In order to comply with the Act, power plants generally employ one of two strategies to control $SO_2$ emissions: 1) using high-cost, low-sulfur coal; or 2) installing a flue gas desulfurization (FGD) system to absorb the $SO_2$ in the flue gas stream before it is released to the atmosphere. Currently, about 22% of coal-burning power plants in the U.S. use FGD systems to achieve the mandated $SO_2$ emission level, and this percentage is expected to double in the next seven years in response to future regulations.

The most widely used FGD systems are wet scrubbers using calcium-based sorbent, such as lime or limestone, together with forced oxidation. As the $SO_2$ laden flue gas passes through the FGD system, $SO_2$ is absorbed when exposed to water and limestone as various combinations of calcium sulfate dihydrate ($CaSO_4.2H_2O$), bassanite ($2CaSO_4.H_2O$), and anhydrite ($CaSO_4$). Typically, the precipitate also includes calcite ($CaCO_3$), and minor amounts of fly ash and carbon grains. The precipitate containing hydrated forms of calcium sulfate is referred to as FGD gypsum, or synthetic gypsum, in order to be differentiated from gypsum that occurs as a natural mineral, which consists essentially of calcium sulfate dihydrate. Commercial applications of FGD gypsum include, but are not limited to, wallboard, structural fill, aggregate, mining applications, Portland cement, plaster, glass making, pharmaceutical filler, paper, plastic, floor systems, fuel additive, and agricultural applications such as soil stabilization and soil neutralization.

One of the most popular applications of FGD gypsum is wallboard manufacturing, wherein raw FGD gypsum is calcined (or calcinated) at 250 to 380° F. in a reactor to form stucco, which is further rehydrated and processed into wallboard. In fact, approximately 70% of raw FGD gypsum is used in commercial wallboard manufacturing.

In addition to $SO_2$, trace levels of mercury may also be present in the flue gas being treated by the wet FGD system. As gypsum precipitates in the FGD system, a portion of the mercury may be captured with the FGD gypsum.

The mercury found in FGD gypsum generally originates from coal. The U.S. Geological Survey (USGS) has assembled a nationwide coal information database containing more than 7000 coal samples. Statistics of the analysis of those samples indicates an average mercury content of 170 ppb, with the maximum mercury content being as high as 1.8 ppm.

Mercury in coal is released to a flue gas stream when the coal is combusted. The resulting "fugitive" mercury, either in the form of elemental mercury or ionized mercury, can be captured using existing control methods. The most popular method comprises injecting a mercury sorbent, such as activated carbon, into the flue gas stream to sorb the fugitive mercury, followed by subsequent capture of the mercury-containing activated carbon by particulate control equipment.

Despite the ability of activated carbon to sorb fugitive mercury, activated carbon injection generally requires the use of large quantities of activated carbon, which is costly, and may not sufficiently remove all of the fugitive mercury from the flue gas stream. Therefore, FGD gypsum generally contains a certain amount of mercury which may be released to the environment during the calcination process.

The amount of mercury released during the calcination of FGD gypsum varies. Studies indicate that from 0.6% to 50% of the mercury contained in the FGD gypsum is released to the environment during calcination, depending on the type and initial mercury content of the FGD gypsum.

While activated carbon injection is the most mature technology in controlling mercury emissions from coal combustion, its application to control the mercury release during gypsum calcination is not yet available. As discussed above, a large quantity of activated carbon is required for capturing fugitive mercury in a flue gas stream. However, such a large quantity of activated carbon, when applied to the calcination of a gypsum, would presumably affect the quality of the stucco produced, including for example, the appearance, cube strength, rehydration time, and foam generation/degeneration characteristics of the stucco.

Therefore, there is a need for a method that provides effective mercury release control during the manufacture of wallboard from FGD gypsum. More generally, there is a need for a method that provides effective mercury release control during gypsum calcination. Further, there is a need to provide effective mercury release control during gypsum calcination without substantially affecting the quality of the resulting stucco.

SUMMARY OF THE DISCLOSURE

This disclosure is directed to methods for controlling mercury release during the calcination of gypsum that contains mercury. More specifically, this disclosure is directed to methods for controlling mercury release during gypsum calcination which results in the mercury being safely retained in the stucco product. The method comprises providing mercury containing gypsum and a calcination reactor; providing a mercury sorbent, such as activated carbon and/or derivatives thereof in the reactor; and calcining the gypsum in the reactor to form stucco. Preferably, the mercury content of the stucco is in substantially close approximation to the mercury content of the uncalcined gypsum, while the application characteristics of the stucco remains substantially unaffected with the presence of relatively minor amount of the mercury sorbent.

In a refinement, the application characteristics include, but are not limited to, cube strength, rehydration time and temperature, and foam generation/degeneration characteristics and combinations thereof.

Preferably, the gypsum is selected from the group consisting of natural gypsum, FGD (or synthetic) gypsum, and mixtures thereof. The gypsum may optionally contain other additives or impurities. In a preferred embodiment, the gypsum is FGD gypsum.

The gypsum is calcined in a reactor to form stucco. Without being bound by any particular theory, the calcination of the gypsum removes at least a portion of the water originally contained therein. Preferably, the calcination according to this disclosure is a batch process that is carried out in an enclosed reactor such as a furnace, kiln, kettle, or other enclosure. Other calcination processes, such as a continuous calcination process, may also be employed and should be considered within the scope of this disclosure.

Normally, when the gypsum is calcined in the reactor, the mercury may be released to the environment as either elemental mercury or ionized mercury. However, by using the disclosed methods, a mercury sorbent is provided in the reactor for sorbing the mercury released during gypsum calcination. In a refinement, the mercury sorbent is activated carbon or derivatives thereof. In a preferred embodiment, the mercury sorbent is selected from the group consisting of activated carbon, halogenated activated carbon, and a mixture thereof.

Preferably, the mercury sorbent is provided in the reactor before the calcination of the gypsum, such as by forming a mixture with the gypsum before the gypsum is loaded into the reactor, or alternatively by loading the mercury sorbent into the reactor as a separate batch before the calcination starts. However, although less preferred, the mercury sorbent may also be provided in the reactor during the calcination or even after the calcination of the gypsum. In such cases, the mercury sorbent is injected or sprayed into the reactor using any suitable methods or apparatuses known to those of ordinary skill in the art.

After calcination, the mercury sorbent containing the sorbed mercury is preferably incorporated into the calcination product, i.e. the stucco. To evaluate the effectiveness of the mercury sorbent in controlling mercury release during gypsum calcination, the mercury content of the stucco is measured and compared to the mercury content of the uncalcined gypsum. Unexpectedly, it was found that relatively small amounts of mercury sorbent provide effective mercury release control during calcination of gypsum.

In a preferred embodiment, the amount of the mercury sorbent provided in the reactor is 0.01-2.00 wt % based on the total weight of the material loaded into the reactor. However, it is found that higher amounts of mercury sorbent can also be provided in the reactor to achieve similar, or slightly better mercury emission control, and therefore should be considered within the scope of this disclosure. However, the use of higher concentrations of the mercury sorbent may decrease the cost-efficiency of the disclosed methods, increase the combustibility and/or explosiveness of the sorbent/gypsum mixture and, more importantly, may adversely affect the quality of the stucco produced due to the higher concentration of the sorbent incorporated in the stucco product. As a result, it is preferable that a low concentration of mercury sorbent be used in the disclosed methods so that the application characteristics of the stucco, such as the cube strength, rehydration time and temperature, and foam generation/degeneration characteristics remain substantially unaffected when compared to that of stucco generated by the same method but without the mercury sorbent. As the evaluation of such characteristics is well known in the art and generally outlined in this disclosure, one of ordinary skill in the art will be able to determine, without undue experimentation, the limitation of the amount of the mercury sorbent used in the disclosed method to produce stucco with substantially unaffected application characteristics.

In one embodiment, the mercury sorbent is present in an amount ranging from about 0.01% to about 2.00% based on the total weight of the material loaded into the reactor. However, this exemplary range should not be considered limiting the scope of this disclosure. Other concentrations, either lower than 0.01 wt % or higher than 2.00 wt % may also be used, as long as such concentrations provide effective mercury release control during gypsum calcination without substantially affecting the application characteristics of the stucco produced by the calcination.

Other advantages and features of the disclosed method for providing effective mercury release control during gypsum calcination without substantially affecting the quality of the stucco will be described in greater detail below. Although only a limited number of embodiments are disclosed herein, different variations will be apparent to those of ordinary skill in the art.

BRIEF DESCRIPTION OF THE DRAWINGS

For a more complete understanding of the disclosed methods, reference should now be made to the accompanying drawings, wherein:

FIG. 2 graphically illustrates a microscopic view (SEM images) of the activated carbon;

FIG. 3 graphically illustrates a microscopic view (SEM images) of brominated activated carbon;

FIG. 4 graphically illustrates the effect of the mercury sorbent on the cube strength of the stucco generated by the disclosed method;

FIG. 5 graphically illustrates the effect of the mercury sorbent on the rehydration temperature profile of the stucco generated by the disclosed method;

FIG. 6 graphically illustrates the effects of the mercury sorbent on the foam generation property of the stucco generated by the disclosed method;

FIG. 7 graphically illustrates the effects of the mercury sorbent on the foam degeneration property of the stucco generated by the disclosed method;

Figure 1:
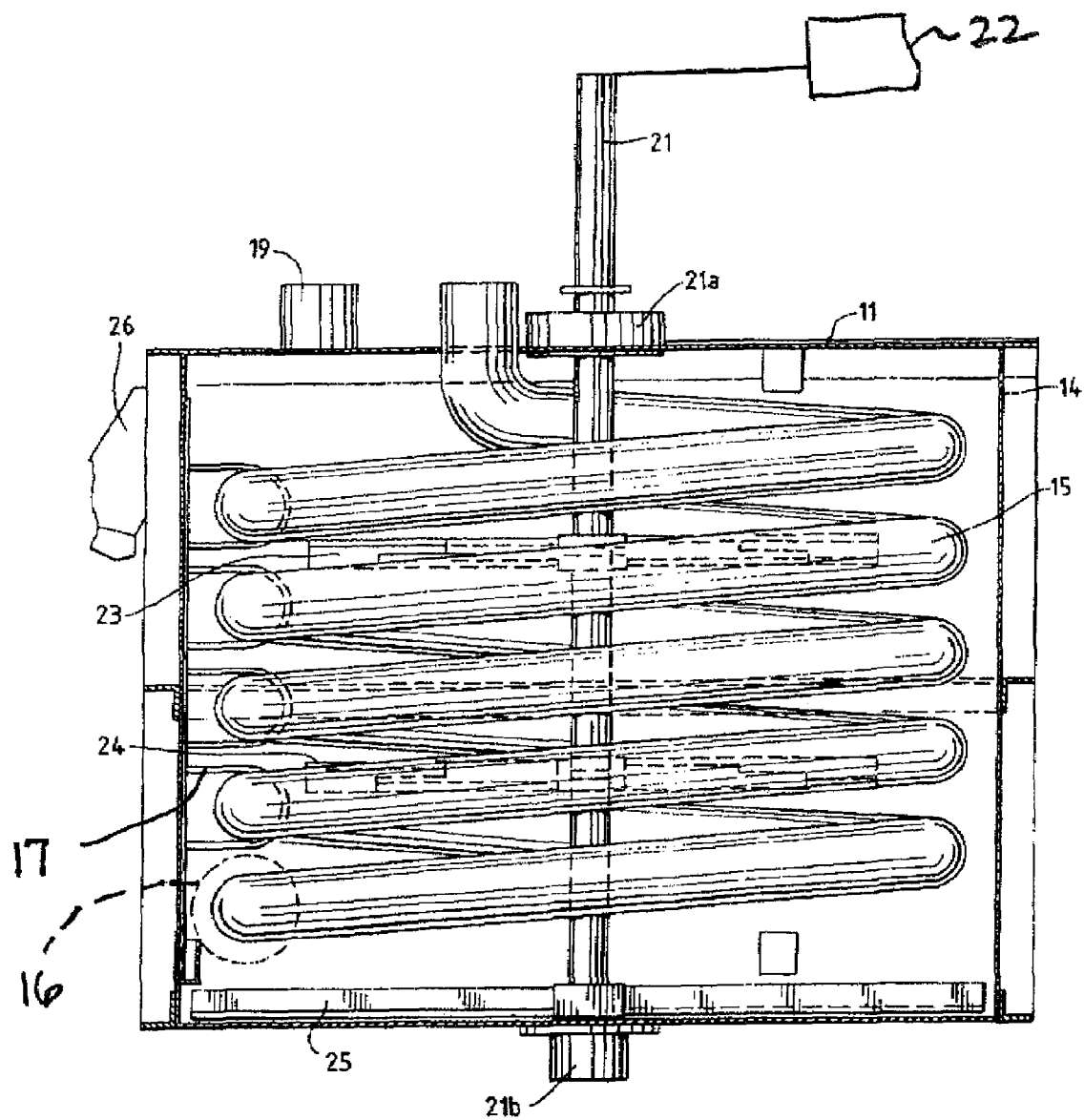
FIG. 1 graphically illustrates an exemplary reactor for gypsum calcination.

It should be understood, of course, that this disclosure is not limited to the particular embodiments illustrated herein.

DETAILED DESCRIPTION OF THE PRESENTLY PREFERRED EMBODBMNTS

In general, this disclosure is directed toward a method for providing effective mercury release control during calcination of gypsum in a reactor, wherein the method comprises providing a mercury sorbent in the reactor, and calcining the gypsum to form stucco. The stucco will contain the mercury and the mercury sorbent. Preferably, the mercury content of the stucco is in close approximation to the mercury content of the gypsum, while one or more application characteristics of the stucco remain substantially unaffected by the presence of the sorbent and mercury as compared to those of conventional stucco. In a preferred embodiment, the one or more application characteristics are selected from the group consisting of cube strength, rehydration time, rehydration temperature, foam generation characteristics, foam degeneration characteristics, and combinations thereof.

In a preferred embodiment, the disclosed method comprises providing a low concentration of the mercury sorbent in the reactor with the gypsum, and calcining the gypsum to form stucco having mercury content in close approximation to mercury content of the uncalcined gypsum, wherein the mercury sorbent is selected from the group consisting of activated carbon, halogenated activated carbon, and a mixture thereof.

Raw Gypsum

The gypsum to be calcined according to this disclosure is a substance that comprises calcium sulfate dihydrate ($CaSO_4 \cdot 2H_2O$). The gypsum may include naturally occurring gypsum as well as FGD gypsum, which is produced chemically by FGD systems in power plants using coal-fired boilers as discussed above. Unlike natural gypsum that consists essentially of calcium sulfate dihydrate, FGD gypsum consists generally of calcium sulfate dihydrate ($CaSO_4 \cdot 2H_2O$), bassanite ($2CaSO_4 \cdot H_2O$), anhydrite ($CaSO_4$), calcite ($CaCO_3$), and limited amounts of fly ash and carbon grains. The raw FGD gypsum is a fine grained powder with low moisture content.

For purpose of this disclosure, the term "gypsum" may include FGD gypsum, naturally occurring gypsum, and other substances containing at least some calcium sulfate dihydrate, wherein the gypsum also includes mercury that needs to be contained during calcination of the gypsum to form stucco. For purposes of this disclosure, the term "stucco" will be used to refer to the product of the calcination, which contains at least some dehydrated gypsum.

The gypsum is preferably in a form of small particles, such as powders or granules, to allow even and efficient heating of the gypsum. In a preferred embodiment, the gypsum is selected from the group consisting of naturally occurring gypsum, FGD (or synthetic) gypsum, and a mixture thereof. The gypsum may also contain other additives and impurities. In another preferred embodiment, the gypsum to be calcined is FGD gypsum.

According to another aspect of this disclosure, the gypsum contains mercury. Preferably, the mercury is included, embedded, or impregnated in the gypsum. However, the mercury may also be dotted or coated on the surface of the gypsum. The mercury content of the gypsum varies with the source and composition of the gypsum.

Calcination

Calcination (also referred to as calcining) is a thermal treatment process applied to ores and other solid materials in order to bring about a thermal decomposition, phase transition, or removal of a volatile fraction. The calcination process normally takes place at temperatures below the melting point of the product materials. According to this disclosure, the temperature and duration of the calcination of the gypsum is variable and dependent on factors such as the nature of the gypsum, quantity of the gypsum, etc.

According to one aspect of this disclosure, the gypsum is calcined in a reactor to form stucco. Without being bound by any particular theory, the calcination of the gypsum removes at least a portion of the water originally contained therein. The calcination according to this disclosure may be a batch process that is carried out in an enclosed reactor such as a furnace, kiln, kettle, or other enclosure at about 300° F. for about two hours. In some embodiments, the calcination may be carried out in multiple stages, in multiple reactors, or both. Other calcination processes, such as a continuous calcination process or flash calcination, may also be applicable in the disclosed method.

Referring to FIG. 1, which graphically illustrates a tube burner kettle that may be used as the calcination reactor of this disclosure. A conventional feed conveyor (not shown) is provided over an input riser 19 in a kettle 11 for feeding gypsum powder into the kettle 11. Mixing means are also provided in the kettle 11 for mixing the ground gypsum contained therein so as to avoid dead spots in the heating of the gypsum powder. In the embodiment given in FIG. 1, the mixing means take the form of a central shaft 21 mounted on bearings 21a and 21b and connected to a drive means 22 for rotating shaft 21. Shaft 21 includes a plurality of horizontally-extending mixing blades 23, 24 and 25 for mixing the gypsum powder contained in the kettle 11. Other mixing means generally known to one of ordinary skill in the art may also be used for providing sufficient mixing of the gypsum powder.

The kettle 11 includes a kettle shell 14, an internal coil-type burner tube assembly 15, and an external immersion tube burner 16. The burner tube coils 15 are supported by brackets 17 within kettle shells 14 and are arranged in a spiral fashion for uniformly heating the gypsum powder contained therein. The immersion burner 16 is a gas-fired burner which projects a flame into the burner tube coils 15, and causes heating media, typically combustion gases and air, to flow through the tube coils 15 to uniformly heat the contents of the kettle shells 14. The particular capacity of the selected burner 16 will depend upon the desired output temperature of the particular kettle and the interior capacity of the kettle, among other factors.

In operation, the feed conveyor (not shown) delivers the gypsum through the input riser 19 into the kettle 11, and the burner 16 and the burner tubes 15 in the kettle 11 heat the gypsum contained therein to a predetermined temperature. In one embodiment, the gypsum is heated in the kettle 11 to a temperature of about 250-380° F., preferably about 300° F., for a time period of about two hours. Without being bound to any particular theory, such heating causes at least a portion of the gypsum to be dehydrated into stucco that contains calcium sulfate hemihydrates. The stucco is then transferred out of the kettle 11, and may be later rehydrated for various applications, including wallboard manufacturing.

When gypsum is calcined in the reactor, the mercury contained in the gypsum can be released to the environment, or it may adhere to interior surfaces of the reactor, or surfaces of the various structural components in the reactor. The mercury sorbed by the mercury sorbent should not be considered as mercury released to environment, as the mercury sorbent is safely incorporated into the stucco. Thus, with the disclosed techniques, the mercury present in the FGD gypsum is transferred out of the reactor with the dehydrated gypsum product, instead of into the atmosphere or environment.

Mercury Sorbent

According to a further aspect of this disclosure, a mercury sorbent is provided in the reactor for sorbing the mercury released during calcination of the gypsum. For purpose of this disclosure, the term "sorbing" refers to a process of taking up and holding one substance by either adsorption or absorption. Therefore, the mercury sorbent according to this disclosure may take up and hold the mercury released during gypsum calcination by various mechanisms including, but are not limited to, retaining the mercury on the surface of the sorbent, trapping the mercury within the pores and channels of the sorbent, and chemically or physically making the mercury a integral part of the sorbent.

In a refinement, the mercury sorbent is activated carbon or derivatives thereof. In a preferred embodiment, the mercury sorbent is selected from the group consisting of activated carbon, halogenated activated carbon, and a mixture thereof.

Activated carbon, also called activated charcoal or activated coal, is a general term which covers carbon material mostly derived from charcoal. The term "activated" is sometimes substituted with "active." By any name, activated carbon materials have an exceptionally high surface area. As an example, the BET surface area of one type of activated carbon and halogenated activated carbon suitable for use in the disclosed method is 1580 $m^2/g$ and 1534 $m^2/g$, respectively (determined by Particle Technology Labs, Ltd.)

Activated carbon and derivatives thereof typically include a large amount of micro-sized pores and channels, which make them excellent sorbents and/or surface activators. Sufficient sorption or activation for useful applications may come solely from the high surface area, though sometimes chemical treatment or modification, such as halogenation or metal plating, is used to further enhance the sorption or activation of target substances. FIGS. 2 and 3 graphically illustrate the microporosity of the activated carbon and brominated activated carbon suitable for use in the disclosed method, respectively.

Preferably, the mercury sorbent is mixed with the gypsum and subsequently loaded into the reactor before the gypsum is calcined therein. Referring to FIG. 1, the mercury sorbent can be added to the gypsum before the resulting mixture is fed into the kettle 11 through the riser 19. In another embodiment, the gypsum is provided in the reactor during or even after the calcination of the gypsum to capture the released mercury. Such provision can be accomplished by methods and apparatuses generally known to one of ordinary skill in the art. For example, the mercury sorbent can be injected or sprayed into the kettle 11 by one or more injectors or sprayers through one or more ports located on the kettle shell 14.

In one embodiment, the concentration of the mercury sorbent provided in the reactor ranges from about 0.01% to about 2.00% by the total weight of the material loaded into the reactor. However, this exemplary range should not be considered limiting the scope of this disclosure. Other concentrations, either lower than 0.01 wt % or higher than 2.00 wt % may also provide sufficient mercury sorption during the calcination of the gypsum.

Activated carbon is a commercial product available in many grades and physical forms. For example, activated carbon can be obtained from Sigma-Aldrich, under the trade name Darco®, in the form of granular, powder, and wet powder, and with particle sizes as large as 4-12 mesh, or as small as 100-325 mesh. As activated carbon and its application as a sorbent are well known in the technical field of this disclosure, it is to be understood that the physical form and particle size of the activated carbon that are suitable for mercury release control in the disclosed method would be apparent to one of ordinary skill in the art after reading this disclosure.

In addition to activated carbon, the mercury sorbent of this disclosure may also include one or more derivatives of activated carbon. Such derivatives include, but are not limited to, halogenated activated carbon and metal plated activated carbon. The incorporation of a metal plate on at least a portion of the surface of activated carbon to improve its mercury sorption by forming a metal-mercury amalgam is well known in the art.

Moreover, activated carbon may also be halogenated, such as chlorinated, brominated or iodinated, to improve its mercury sorbing performance. Such halogenated activated carbon may include one or more forms of halogen species, such as atomic, radical, ionized or molecular halogen species. Without being bound by any particular theory, those halogen species may be adsorbed on, absorbed by, attached to, or trapped within, the activated carbon, and may readily interact with mercury chemically and/or physically, thereby improving the ability of the activated carbon to sorb the mercury released during gypsum calcination. Methods and apparatus for halogenation of activated carbon are well known in the art. As an example, a general procedure for preparation of brominated activated carbon is provided below.

Activated carbon (5 g) was placed in a beaker and 5 ml of $HNO_3$ (70% strength), 10 ml of HBr (50% strength; 7.35 g Br) and 85 ml of water were added to the beaker and the mixture was stirred and the materials reacted in the beaker for one hour. A solid reaction product was recovered by filtration and was washed with water and then dried in air in an oven for two hours at 120° C. The dried brominated material was heated in argon for one hour at 400° C. and cooled to room temperature. The resulting brominated activated carbon is ready for use in the disclosed method. Although this is an exemplary method for preparation of brominated activated carbon, it is nevertheless applicable to the preparation of other halogenated activated carbons. Moreover, it is to be understood that other methods for halogenation of activated carbon would be apparent to one of ordinary skill in the art and therefore should not be considered as limiting the scope of this disclosure.

In addition to the metal-plated or halogenated activated carbon disclosed above, other known modifications of activated carbon may also be used in the disclosed method, and should be considered within the scope of this disclosure.

Mercury Release Control

After calcination, the dehydrated gypsum preferably consists essentially of stucco. According to one aspect of this disclosure, the mercury sorbent, together with the mercury adsorbed thereon or absorbed therein, is incorporated into the stucco. As discussed above, it is to be understood that "mercury release" in this disclosure, generally refers to the mercury that is released to the environment and not retained in the stucco.

To evaluate the effectiveness of the mercury sorbent in controlling the mercury release during the calcination of the gypsum, the mercury content of the stucco is measured and compared to the mercury content of the gypsum. If both mercury contents are in reasonably close approximation with each other, the mercury released to the environment is minimal, which in turn indicates that an effective mercury release control is achieved by the disclosed method.

Unexpectedly, it was discovered that a low concentration of mercury sorbent can provide effective control of mercury release during the calcination of the gypsum. In particular, by providing a low concentration of mercury sorbent into the reactor, the mercury content of the resulting stucco is approximately the same as mercury content of the uncalcined gypsum.

In a preferred embodiment, the concentration of the mercury sorbent provided in the reactor is 0.01-2.00 wt % based on the total weight of the material loaded into the reactor. However, it is found that higher or lower concentrations of the mercury sorbent can also be provided in the reactor to achieve similar or even better mercury release control, and therefore should be considered within the scope of this disclosure.

In order to evaluate the mercury release control during the calcination of the gypsum, lab calcination experiments were performed with activated carbon (AC) and brominated activated carbon (BAC) of various concentrations. Three raw FGD gypsums (FGD A, FGD B, and FGD C) were used in those experiments. In the experiments, activated carbon or brominated activated carbon (0.025-2 wt %) was added to the raw FGD gypsums respectively. The resulting mercury sorbent/gypsum mixtures were calcined at a temperature of 300° F. in a furnace or kettle for 2 hours to generate stucco. The mercury content of the stucco was determined with DMA-80 mercury analyzer to be compared with the mercury content of the raw FGD gypsums.

The results of those experiments are listed in Table 1. First, three baseline experiments were performed to obtain the mercury contents of the raw FGD gypsums. Second, six control experiments were performed to obtain the mercury contents of the stucco generated without the presence of the mercury sorbent. Finally, for each type of raw FGD gypsum, a first series of experiments were performed to obtain the mercury content of the stucco with various concentrations of activated carbon, and a second series of experiments were performed to obtain the mercury content of the stucco with various concentrations of brominated activated carbon.

The mercury release during gypsum calcination is represented by Mercury Loss (ML), which is defined as:

$$ML = (MC_{gyp} - MC_{stu})/MC_{gyp} \times 100\%$$

wherein $MC_{gyp}$ is the mercury content of the raw FGD gypsum; and $MC_{stu}$ is the mercury content of the stucco generated. If ML of a calcination experiment is negative or close to zero, the mercury content of the stucco is in close approximation to the mercury content of the raw FGD gypsum, which indicates that an effective mercury release control is achieved. As indicated in Table 1, the mercury contents of the stucco in all six control experiments are substantially lower than those of the corresponding raw FGD gypsums (with mercury loss of 2.18-15.7%), which confirms that substantial mercury release occurred without the presence of the mercury sorbent. By adding a mercury sorbent, however, the mercury release during calcination can be significantly suppressed or even completely eliminated, which is clearly indicated by the significantly reduced mercury loss exhibited in experiments of calcination processes with the presence of the mercury sorbent as compared to those of the control experiments (see Table 1).

Increasing the concentration of the mercury sorbent, however, does not necessarily improve the mercury release control during calcination. Accordingly, the use of excessive amount of mercury sorbent may not be economically advantageous. Moreover, as the calcination process is carried out at relatively high temperatures, the inclusion of excessive amount of mercury sorbent may increase the combustibility and/or explosiveness of the gypsum/mercury sorbent mixture, and therefore may present an unnecessary safety risk to the use of the disclosed method. Finally, as the mercury sorbent is eventually incorporated in the stucco, the provision of excessive amount of mercury sorbent in the calcination reactor may result in a higher mercury sorbent content of the stucco, which may adversely affect the application characteristics of the stucco.

Hence, one advantage of the disclosed method is the use of only low concentrations of the mercury sorbent to provide effective mercury release control during gypsum calcination without substantially affecting the application characteristics of the stucco generated thereby. In general, effective mercury release control is achieved when the mercury loss of a calcination process is lower than that of the corresponding control

TABLE 1

Effect of AC & BAC on Mercury Release During Gypsum Calcination

| Raw FGD Gypsum | Activated Carbon | Concentration (%) | Temperature (F.) | Combined Water (%) | Mercury Content (ppb) | Mercury Loss (%) |
|---|---|---|---|---|---|---|
| FGD A | Baseline | 0 | Ambient | 20.26 | 163.8 | |
| FGD B | Baseline | 0 | Ambient | 20.300 | 100.8 | |
| FGD C | Baseline | 0 | Ambient | 20.228 | 1005.0 | |
| FGD A | Control | 0 | 300 | 6.349 | 138.1 | 15.7 |
| FGD A | AC | 0.5 | 300 | 6.191 | 164.9 | −0.66 |
| FGD A | AC | 1.0 | 300 | 6.113 | 165.4 | −0.94 |
| FGD A | AC | 2.0 | 300 | 6.209 | 163.6 | 0.12 |
| FGD A | AC | 0 | 300 | 6.427 | 146.1 | 10.80 |
| FGD A | AC | 0.025 | 300 | 6.616 | 160.9 | 1.82 |
| FGD A | AC | 0.050 | 300 | 6.557 | 165.6 | −1.06 |
| FGD A | AC | 0.075 | 300 | 6.458 | 164.9 | −0.62 |
| FGD A | AC | 0.1 | 300 | 5.988 | 169.4 | −3.42 |
| FGD B | Control | 0 | 300 | 7.235 | 98.6 | 6.72 |
| FGD B | AC | 0.025 | 300 | 6.258 | 101.8 | 3.65 |
| FGD B | AC | 0.050 | 300 | 6.771 | 105.3 | 0.39 |
| FGD B | AC | 0.075 | 300 | 7.068 | 104.3 | 1.25 |
| FGD B | AC | 0.1 | 300 | 6.199 | 105.7 | 0.0 |
| FGD C | Control | 0 | 300 | 6.458 | 954.5 | 5.02 |
| FGD C | AC | 0.025 | 300 | 6.412 | 968.2 | 3.66 |
| FGD C | AC | 0.050 | 300 | 5.791 | 988.5 | 1.64 |
| FGD C | AC | 0.075 | 300 | 6.202 | 994.6 | 1.04 |
| FGD C | AC | 0.1 | 300 | 6.417 | 984.8 | 2.01 |
| FGD A | Control | 0 | 300 | 6.161 | 150.6 | 14.00 |
| FGD A | BAC | 0.025 | 300 | 6.243 | 177.0 | −1.09 |
| FGD A | BAC | 0.050 | 300 | 6.055 | 176.0 | −0.49 |
| FGD A | BAC | 0.075 | 300 | 6.238 | 174.2 | −0.53 |
| FGD A | BAC | 0.1 | 300 | 5.830 | 175.1 | −0.0 |
| FGD B | Control | 0 | 300 | 6.407 | 89.1 | 11.53 |
| FGD B | BAC | 0.025 | 300 | 6.436 | 102.1 | −1.36 |
| FGD B | BAC | 0.050 | 300 | 6.011 | 101.7 | −0.98 |
| FGD B | BAC | 0.075 | 300 | 6.917 | 100.8 | −0.01 |
| FGD B | BAC | 0.1 | 300 | 6.419 | 101.1 | −0.37 |
| FGD C | Control | 0 | 300 | 6.17 | 965.4 | 3.94 |
| FGD C | BAC | 0.025 | 300 | 6.501 | 988.8 | 1.61 |
| FGD C | BAC | 0.05 | 300 | 6.256 | 1001.5 | 0.35 |
| FGD C | BAC | 0.075 | 300 | 5.957 | 951.4 | 5.34 |
| FGD C | BAC | 0.1 | 300 | 6.273 | 980.8 | 2.41 |

The results of the lab calcination experiments clearly indicate that the mercury sorbent provides excellent mercury retention even at very low concentrations, such as 0.025 wt %.

experiment. Preferably, effective mercury release control is achieved when the mercury loss of a calcination process is about zero or close to zero.

It is also noteworthy that the effectiveness of the mercury sorbent is dependent on the mercury content of the gypsum. In particular, while effective mercury release control is achieved during calcination of low mercury-content gypsums, such as FGD A and B, the mercury release control during calcination of high mercury-content gypsums, such as FGD C, is typically less effective with the same concentration of mercury sorbent. In such cases, a higher concentration of the mercury sorbent may be needed to achieve the desired mercury release control.

As the mercury sorbent provided in the reactor preferably does not substantially affect one or more application characteristics of the stucco, the maximum concentration of the mercury sorbent provided in the reactor can be determined by those of ordinary skill in the art according to this disclosure and general knowledge in this technical field without undue experimentation. Such application characteristics include the cube strength, rehydrate time and temperature, foam generation and foam degeneration of the stucco.

Stucco Characteristics—Strength

To evaluate the effects of the mercury sorbent on the strength of the stucco, mercury sorbents of various concentrations were mixed with FGD A-C, respectively, and calcined at 300° F. for two hours to form stucco. A sample plaster was made from the stucco with water, starch, accelerator and other additives. Several control plasters were similarly prepared from stucco generated by calcination of FGD A-C without the presence of the mercury sorbent. Both the sample plasters and control plasters were cast into cubes. The strength of the cubes was tested according to standard procedures known to those skilled in the art.

The results of the cube strength tests are listed in Table 2, and further illustrated in FIG. 4, both of which indicate that the cube strength of stucco containing mercury sorbent is substantially similar to that of the control sample (stucco without mercury sorbent). For purposes of this disclosure, substantially similar cube strength is achieved when the cube strength of a sample plaster is within 15% variation of the cube strength of a control plaster. In one embodiment of the disclosed method, the concentration of the mercury sorbent provided in the calcination reactor does not adversely affect the strength of stucco generated by the method. That is, the cube strength of the stucco containing the mercury sorbent is within 15% variation of that of stucco without the mercury sorbent.

TABLE 2

Effect of Mercury Sorbent on Cube Strength

| | FGD A | | | FGD B | | |
|---|---|---|---|---|---|---|
| | Density (lb/cf) | Strength (PSI) | Normal (%) | Density (lb/cf) | Strength (PSI) | Normal (%) |
| Control 1 | 52.9 | 2029 | 175 | 52.1 | 1908.0 | 176 |
| Control 2 | 52.9 | 2030 | 176 | 52.1 | 1943.0 | 181 |
| Control 3 | 52.9 | 2023 | 175 | 52.3 | 1933.0 | 176 |
| AC 0.025% | 53.0 | 2056 | 175 | 52.4 | 2084.0 | 189 |
| AC 0.025% | 53.1 | 2119 | 180 | 52.2 | 2104.0 | 194 |
| AC 0.025% | 52.9 | 2119 | 183 | 52.0 | 1971.0 | 184 |
| AC 0.05% | 52.9 | 2167 | 183 | 52.8 | 2174.0 | 190 |
| AC 0.05% | 52.6 | 2070 | 184 | 52.8 | 2072.0 | 180 |
| AC 0.05% | 52.4 | 2028 | 168 | 52.9 | 2062.0 | 178 |
| AC 0.075% | 53.1 | 1982 | 168 | 52.4 | 2070.0 | 187 |
| AC 0.075% | 53.1 | 1983 | 167 | 52.4 | 2016.0 | 183 |
| AC 0.075% | 52.8 | 1915 | 166 | 52.2 | 2035.0 | 187 |
| AC 0.1% | 52.9 | 1980 | 170 | 53.1 | 2130.0 | 180 |
| AC 0.1% | 53.0 | 1971 | 168 | 52.9 | 2069.0 | 178 |
| AC 0.1% | 52.8 | 2146 | 186 | 52.8 | 2068.0 | 180 |

TABLE 2-continued

Effect of Mercury Sorbent on Cube Strength

| | FGD A | | | FGD B | | |
|---|---|---|---|---|---|---|
| | Density (lb/cf) | Strength (PSI) | Normal (%) | Density (lb/cf) | Strength (PSI) | Normal (%) |
| BAC 0.025% | 52.9 | 1952 | 169 | 52.9 | 2124.0 | 182 |
| BAC 0.025% | 52.8 | 1963 | 171 | 53.1 | 2040.0 | 172 |
| BAC 0.025% | 52.7 | 2051 | 181 | 52.6 | 2196.0 | 194 |
| BAC 0.05% | 52.8 | 2043 | 178 | 52.9 | 2188.0 | 189 |
| BAC 0.05% | 52.8 | 1783 | 155 | 52.6 | 2008.0 | 178 |
| BAC 0.05% | 52.7 | 1942 | 170 | 52.7 | 2069.0 | 182 |
| BAC 0.075% | 53.3 | 2310 | 192 | 52.5 | 2066.0 | 184 |
| BAC 0.075% | 53.0 | 2249 | 192 | 52.7 | 2115.0 | 186 |
| BAC 0.075% | 53.0 | 2337 | 201 | 52.3 | 1990.0 | 180 |
| BAC 0.1% | 52.9 | 2060 | 177 | 52.8 | 2040.0 | 178 |
| BAC 0.1% | 52.6 | 2046 | 181 | 52.7 | 2025.0 | 178 |
| BAC 0.1% | 52.7 | 1968 | 172 | 52.2 | 2053.0 | 188 |

Stucco Characteristics—Rehydration

Another important application characteristic of stucco is the rehydration time and temperature. During wallboard manufacturing, stucco is mixed with water and other additives to form a plaster. It is then cast in moulds, extruded, applied as thick slurry to a surface, or laminated between paper boards. Additives are used to change the density of the plaster and, in the case of plaster board, to help the plaster to mechanically bond to the paper.

In a manufacturing operation, excess water is added to ensure complete rehydration of plaster back to the dihydrate form and to provide sufficient fluidity for manufacturing processes. This rehydration is typically accompanied by an increase in temperature and a light expansion of the plaster. The excess water is then removed either by simply allowing the plaster to dry by evaporation or by heating it to up to 250° C. for up to 60 minutes, while the plaster solidifies. Important parameters of the rehydration process include the time required to achieve 50% rehydration, the time required to for the rehydrated calcium sulfate to achieve final set, and the temperature profile of the rehydration process.

To evaluate the effect of the mercury sorbent on the rehydration of the calcium sulfate generated by the disclosed method, Temperature Rise Set (TRS) tests were conducted to measure and record rehydration times, set times and temperature profiles of rehydration of calcium sulfate generated by the disclosed method. For each raw gypsum, a control TRS test was also conducted on rehydration of calcium sulfate generated by calcination without the presence of the mercury sorbent.

The formulation of the plasters used in the TRS tests was the same as that used in the cube strength tests. The plasters were left to dry by evaporation, while the aforementioned parameters were monitored and recorded throughout the rehydration process. The results of the TRS tests are listed in Table 3, which clearly demonstrate that a low concentration of mercury sorbent does not adversely affect the 50% rehydration time and final set time, of the plaster. For example, both 50% rehydration time and final set time of plasters containing mercury sorbent are within 6% variation of those of the control plaster.

TABLE 3

TRS data and results of 0.1% activated carbon in LG&E and IPL stucco.

|  | FGD A | | | FGD B | | |
| --- | --- | --- | --- | --- | --- | --- |
|  | Control | 0.1% AC | 0.1% BAC | Control | 0.1% AC | 0.1% BAC |
| Initial Slurry Temperature | 73.7 | 73.5 | 72.2 | 73.2 | 74.4 | 74.4 |
| Maximum RR End Time | 8.08 | 8.42 | 8.08 | 8.17 | 7.92 | 7.92 |
| Maximum Rate of Temperature Rise | 7.1 | 6.7 | 6.8 | 7.0 | 7.4 | 7.4 |
| 10% rehydration | 3.25 | 0.17 | 3.25 | 3.42 | 3 | 2.92 |
| 50% rehydration | 7.08 | 7.25 | 7.17 | 7.25 | 7 | 6.83 |
| 98% rehydration | 11.25 | 11.5 | 11.42 | 11.58 | 11.5 | 11.0 |
| Final Set Time | 13.08 | 13.58 | 13.25 | 13.17 | 13.83 | 12.75 |
| Final Set Temperature | 108.4 | 107.2 | 106.3 | 106.5 | 109.9 | 108.2 |
| Total Temperature Rise | 34.7 | 33.7 | 34.0 | 33.2 | 35.5 | 33.8 |

The temperature profile of the rehydration process is also listed in Table 3, and further illustrated in FIG. 5. The temperature profiles of the sample plasters containing 0.1 wt % mercury sorbent are in close approximation to those of the control plasters (without the mercury sorbent). For example, the maximum rate of temperature rise, the final set temperature, and the total temperature rise of the sample plasters are all within 10% variation of those of the control plasters, regardless of the type of the mercury sorbent used.

Stucco Characteristics—Foam Generation/Degeneration

The effect of the mercury sorbent on foam generation and degeneration are shown in FIGS. 6 and 7. Both figures indicate that the mercury sorbent affects the foam generation and degeneration. Brominated activated carbon generates more foam volume than control (without mercury sorbent), while activated carbon generates less. Their effects on foam degeneration, on the other hand, are reversed, with activated carbon showing better foam degeneration performance than brominated activated carbon. It is noteworthy, however, that the foam generation and degeneration tests were carried out with 2 wt % mercury sorbent, which is likely to be higher than what is needed for providing effective mercury release control during gypsum calcination.

While only certain embodiments have been set forth, alternative embodiments and various modifications will be apparent from the above descriptions to those skilled in the art. These and other alternatives are considered equivalents and within the scope of this disclosure.

What is claimed is:

1. A method for controlling mercury release during gypsum calcination, comprising:
   providing gypsum and a calcination reactor, the gypsum containing mercury;
   providing a mercury sorbent in the calcination reactor;
   calcining the gypsum in the reactor to form stucco;
   allowing the mercury contained in the gypsum to be sorbed by the mercury sorbent; and
   retaining the mercury sorbent in the stucco.

2. The method according to claim 1 wherein the gypsum is FGD gypsum.

3. The method according to claim 1 wherein the mercury sorbent is selected from the group consisting of activated carbon, halogenated activated carbon, and mixtures thereof.

4. The method according to claim 1 wherein the calcining of the gypsum is carried out at about 300° F.

5. The method according to claim 1 wherein the mercury sorbent is provided into the reactor before the calcining of the gypsum.

6. The method according to claim 1 wherein the mercury sorbent is provided into the reactor in an amount equal to from about 0.01 to about 2.00 wt % based on total weight of material placed in the reactor.

7. The method according to claim 1 wherein the retaining of the mercury sorbent in the stucco does not adversely affect at least one application characteristic of the stucco.

8. The method according to claim 7 wherein the at least one application characteristic of the stucco is selected from the group consisting of cube strength, final set time, 50% rehydration time, maximum rate of temperature rise, final set temperature, and total temperature rise.

9. The method according to claim 1 wherein mercury loss during the calcining of the gypsum is lower than mercury loss during calcining the gypsum without the mercury sorbent.

10. The method according to claim 1 wherein mercury loss during the calcining of the gypsum is no more than about 2%.

11. A method for controlling mercury release during gypsum calcination, comprising:
    providing gypsum and a calcination reactor, the gypsum containing mercury;
    providing a mercury sorbent in the calcination reactor;
    calcining the gypsum in the reactor to form stucco; and
    retaining the mercury sorbent in the stucco,
    wherein mercury loss during the calcining of the gypsum is lower than mercury loss during calcining of the gypsum without the mercury sorbent under otherwise the same conditions.

12. The method according to claim 11 wherein mercury loss during the calcining of the gypsum is no more than about 2%.

13. The method according to claim 11 wherein the gypsum is FGD gypsum.

14. The method according to claim 11 wherein the mercury sorbent is selected from the group consisting of activated carbon, halogenated activated carbon, and a mixture thereof.

15. The method according to claim 1 wherein the provision of the mercury sorbent into the reactor does not adversely affect at least one application characteristic of the stucco.

16. The method according to claim 15 wherein the at least one application characteristic of the stucco is selected from the group consisting of cube strength, final set time, 50% rehydration time, maximum rate of temperature rise, final set temperature, and total temperature rise.

17. The method according to claim 11 wherein cube strength of the stucco is within about 15% variation of a reference cube strength of stucco formed without the mercury sorbent.

18. The method according to claim 11 wherein final set time of the stucco is within about 6% variation of a reference final set time of stucco formed without the mercury sorbent.

19. A method for controlling mercury release during gypsum calcination, comprising:

provinding gypsum and a calcination reactor, the gypsum containing mercury;

mixing a mercury sorbent with the gypsum to form a mixture;

feeding the mixture in the calcination reactor;

calcining the gypsum in the reactor to form stucco; and retaining the mercury sorbent in the stucco, wherein mercury loss during the calcining of the gypsum is lower than mercury loss during calcining of the gypsum without the mercury sorbent.

20. The method according to claim 19 wherein the mercury sorbent is selected from the group consisting of activated carbon, halogenated activated carbon, and a mixture thereof and the mercury sorbent is provided into the reactor in an amount equal to from about 0.01 to about 2.00 wt % based on total weight of material placed in the reactor.

* * * * *